(12) United States Patent
Fung et al.

(10) Patent No.: US 8,889,026 B2
(45) Date of Patent: Nov. 18, 2014

(54) TRANSPARENT HEAT-SHIELDING MATERIAL EXCELLENT IN INFRARED-BLOCKING PROPERTIES AND TRANSPARENT HEAT-SHIELDING FILM MADE OF THE SAME

(71) Applicant: Nan Ya Plastics Corporation, Taipei (TW)

(72) Inventors: Dein-Run Fung, Taipei (TW); Sen-Huang Hsu, Taipei (TW); Wei-Sheng Cheng, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 121 days.

(21) Appl. No.: 13/746,534

(22) Filed: Jan. 22, 2013

(65) Prior Publication Data

US 2013/0200292 A1  Aug. 8, 2013

(30) Foreign Application Priority Data

Feb. 8, 2012  (TW) .............................. 101104021 A

(51) Int. Cl.
*E04B 1/76* (2006.01)
(52) U.S. Cl.
CPC ................ *E04B 1/76* (2013.01); *Y10S 501/904* (2013.01)
USPC ............................ 252/62.2; 252/587; 501/904

(58) Field of Classification Search
USPC .................................. 252/62.2, 587; 501/904
See application file for complete search history.

(56) References Cited

U.S. PATENT DOCUMENTS

| | | | |
|---|---|---|---|
| 8,258,226 B2 * | 9/2012 | Fujita .............................. | 524/406 |
| 2006/0178254 A1 * | 8/2006 | Takeda et al. ...................... | 501/1 |
| 2014/0175324 A1 * | 6/2014 | Lee et al. ......................... | 252/62 |
| 2014/0187701 A1 * | 7/2014 | Chung et al. .................. | 524/406 |

FOREIGN PATENT DOCUMENTS

| WO | WO 2005/037932 | * | 4/2005 |
|---|---|---|---|
| WO | WO 2012/140896 | * | 10/2012 |

* cited by examiner

*Primary Examiner* — Carol M Koslow
(74) *Attorney, Agent, or Firm* — Bacon & Thomas, PLLC

(57) ABSTRACT

A transparent heat-shielding material having a chemical formula $Cs_XN_YWO_{3-Z}Cl_C$, characterized by being co-doped with elements of different groups in the periodic table, wherein Cs is cesium; N is tin (Sn) or antimony (Sb) or bismuth (Bi); W is tungsten; O is oxygen; and X, Y, Z, and C are positive numbers satisfying the following conditions:
$X \leq 1.0$, $Y \leq 1.0$, $Y/X \leq 1.0$, $Z \leq 0.6$, and $C \leq 0.1$;
the transparent heat-shielding material is used to make a highly transparent and highly effective heat-shielding film which can be adhered to glass panels of buildings and automobiles to block infrared radiation in the wavelength range of 800-2000 nm, thereby insulating heat and saving energy; and the film is also applicable as a composite substrate for electronic components.

3 Claims, 3 Drawing Sheets

TRANSPARENT HEAT-SHIELDING MATERIAL EXCELLENT IN INFRARED-BLOCKING PROPERTIES AND TRANSPARENT HEAT-SHIELDING FILM MADE OF THE SAME

BACKGROUND OF THE PRESENT INVENTION

1. Field of the Invention

The present invention relates to a transparent heat-shielding material and a method for making the same. More particularly, the present invention relates to a transparent heat-shielding film made of such a transparent heat-shielding material and featuring high transparency as well as excellent infrared-blocking properties.

2. Description of Related Art

In order to save energy and reduce carbon dioxide emissions, it is a common practice nowadays to carry out thermal insulation with a layer of heat-shielding material adhered to the glass panels of building and automobiles. A notable example of heat-shielding materials is metal oxides, whose physical properties contribute to effective thermal insulation and which have been widely used to block infrared radiation.

For instance, U.S. Pat. No. 5,385,751 discloses a fluorine-doped tungsten oxide as an infrared-blocking material. This material is made by chemical vapor deposition and is hence disadvantaged by a high manufacturing equipment cost and a high production cost.

Japanese Patent Application Laid-Open No. Hei 9-12338 discloses an infrared-blocking film which includes a composite tungsten oxide composed of the element tungsten and specific elements of, for example, the IVA group in the periodic table. This infrared-blocking film is made by a sputtering process in which the transparent glass substrate for supporting the film is exposed to high-temperature plasma. Because of that, the infrared-blocking film tends to be affected by high-energy ion beams in the plasma while being formed and may end up defective. To lower the defect density of the infrared-blocking film, an annealing apparatus is required for providing a heat treatment, which, however, adds to the complexity and cost of manufacture.

Japanese Patent Application Laid-Open No. 2003-121884 discloses a method for making a tungsten trioxide powder, wherein the method includes the steps of: dissolving tungsten hexafluoride in alcohol, separating a precipitate from the solution, and heating the precipitate at 100-500° C. to produce the tungsten trioxide powder. The tungsten trioxide powder thus obtained is applicable as an infrared-blocking material.

US Patent Application Publication No. 2006/0178254 discloses a method for making a composite tungsten oxide, wherein the method includes the steps of:

a) selecting one of a tungsten trioxide powder, a tungsten dioxide powder, a tungsten oxide hydrate powder, a tungsten hexachloride powder, and an ammonium tungstate powder;

b) selecting a powder of either an element M or a compound containing the element M, wherein the element M is more than one kind of element selected from the group consisting of H, He, alkali metals, alkaline earth metals, and rare earth elements;

c) mixing the powder of step a) with the powder of step b) at a specific ratio, adding alcohol or water into the mixture to produce a tungsten oxide hydrate, and drying the tungsten oxide hydrate;

d) performing the following two-stage heat treatment on the dried tungsten oxide hydrate of step c):

d-1) the first-stage heat treatment: heating the dried tungsten oxide hydrate at a sintering temperature of 100-850° C. in a reductive gas atmosphere, such as in an environment into which hydrogen gas ($H_2$) is supplied; and d-2) the second-stage heat treatment: once the dried tungsten oxide hydrate having received the first-stage heat treatment is cooled down to room temperature, heating it at a sintering temperature of 650-1200° C. in an inert gas atmosphere, such as in an environment into which argon gas (Ar) is supplied; and e) grinding and thereby pulverizing the composite tungsten oxide which has completed the two-stage heat treatment, so as to produce composite tungsten oxide particles expressed by the general formula MxWyOz.

The composite tungsten oxide particles made by the method of the afore-cited US patent application publication can block infrared radiation sufficiently and are suitable for use as an infrared-blocking material. Nevertheless, the two-stage heat treatment required for making the composite tungsten oxide complicates the manufacturing process, which is undesirable.

SUMMARY OF THE INVENTION

With a view to solving the aforesaid problems of the prior arts, the primary object of the present invention is to provide a composite metal tungsten oxychloride and a manufacturing method thereof, wherein the composite metal tungsten oxychloride is highly transparent, highly effective in thermal insulation, and adjustable in terms of the degree of thermal insulation. As the manufacturing method only requires a one-step heat treatment, the production process is both simple and low-cost. Moreover, the product of the manufacturing method, i.e., the composite metal tungsten oxychloride (hereinafter referred to as composite tungsten oxychloride for short), is suitable for use as an infrared-blocking material due to its high transparency and effectiveness in thermal insulation.

The composite tungsten oxychloride of the present invention is formed by co-doping with the element cesium (Cs) and a chloride containing at least one of the metal elements tin (Sn), antimony (Sb), and bismuth (Bi) in an appropriate co-doping ratio. The composite tungsten oxychloride has the chemical formula $Cs_XN_YWO_{3-Z}Cl_C$, wherein Cs is cesium; N is tin (Sn) or antimony (Sb) or bismuth (Bi); W is tungsten; O is oxygen; and X, Y, Z, and C are positive numbers satisfying the following conditions:

$X \leq 1.0$, $Y \leq 1.0$, $Y/X \leq 1.0$, $Z \leq 0.6$, and $C \leq 0.1$.

The cesium (Cs) in the composite tungsten oxychloride tends to release one free electron whereas the co-doping metal element tin (Sn) or antimony (Sb) or bismuth (Bi) tends to release four to five free electrons. Although cesium (Cs) has a different absorption wavelength range from tin (Sn) or antimony (Sb) or bismuth (Bi), the two co-dopants, i.e., cesium (Cs) and the metal element tin (Sn) or antimony (Sb) or bismuth (Bi), share a common infrared band of the wavelengths 800-2000 nm, in which both co-dopants show particularly strong absorptivity.

According to the present invention, the method for making a composite tungsten oxychloride includes the following steps:

a. Dissolve tungsten hexachloride in alcohol to produce a solution A;

b. Mix cesium chloride (CsCl) and a chloride containing the metal element tin (Sn) or antimony (Sb) or bismuth (Bi) into water to produce a solution B, wherein the two chlorides are mixed in appropriate amounts (in an appropriate ratio);

c. Co-deposit the solutions A and B to generate a precipitate; and d. Perform a one-time sintering heat treatment on the precipitate of step c to produce a composite tungsten oxychloride powder.

According to the present invention, the method for making a composite tungsten oxychloride involves performing the one-time sintering heat treatment at a sintering temperature of 450-800° C. in an environment into which hydrogen gas or/and argon gas are supplied in a certain ratio. The purpose of supplying hydrogen gas or/and argon gas into the heat treatment is to prevent the composite tungsten oxychloride from being partly reduced to tungsten trioxide ($WO_3$), which compromises the absorption of near-infrared radiation. If hydrogen gas and argon gas are supplied at the same time, the weatherability of the composite tungsten oxychloride will be enhanced.

The method disclosed herein for making a composite tungsten oxychloride is applicable to the manufacture of a composite tungsten oxychloride material having the chemical formula $Cs_XN_YWO_{3-Z}Cl_C$, wherein N is the metal element tin (Sn) or antimony (Sb) or bismuth (Bi). Provided that the co-doping ratio of the metal element N to the element Cs (i.e., Y/X) is less than or equal to 1.0 (i.e., X/Y≤1.0), the use amount of the metal element N may be adjusted to change the co-doping ratio (Y/X) of the metal element N to the element Cs. Under proper high-temperature-furnace heat treatment conditions, the physical properties of the resultant composite tungsten oxychloride material vary with the co-doping ratio (Y/X) to show different infrared cut rates. The higher the co-doping ratio of the metal element N to the element cesium (Y/X) is, the higher the infrared cut rate (i.e., the better the thermal insulation effect) of the resultant composite tungsten oxychloride material will be. Therefore, the method of the present invention can be used to manufacture a composite tungsten oxychloride whose degree of thermal insulation is adjustable according to the requirements of different applications.

The composite tungsten oxychloride of the present invention contains the element chlorine, has an infrared cut rate higher than 70%, and is suitable for making a highly transparent heat-shielding film to be adhered to the glass panels of buildings and automobiles as a way to block out or retain heat and save energy. The highly transparent heat-shielding film may also be used as a composite substrate for electronic components.

The disclosed method for making a composite tungsten oxychloride has the following features:

1. As the method only requires a one-time sintering heat treatment, not only is the manufacturing process made simple, but also the production cost is reduced.

2. The composite tungsten oxychloride produced by the method has an outstanding infrared cut rate as well as a high visible light transmittance.

3. The composite tungsten oxychloride produced by the method has long-term quality stability and is good for industrial use.

BRIEF DESCRIPTION OF THE DRAWINGS

The present invention will be best understood by referring to the following detailed description in conjunction with the accompanying drawings, in which.

DETAILED DESCRIPTION OF THE INVENTION

The present invention discloses a composite tungsten oxychloride formed by co-doping with the element cesium (Cs) and a chloride containing the metal element tin (Sn) or antimony (Sb) or bismuth (Bi), wherein the co-doping is carried out in an appropriate ratio. The composite tungsten oxychloride has such physical properties that it can effectively absorb and thereby block radiation in the infrared band, particularly in the wavelength range of 800-2000 nm, and more particularly in the wavelength range of 800-1000 nm. The physical properties of the composite tungsten oxychloride also contribute to a high visible light transmittance. Thus, the composite tungsten oxychloride is suitable for use as a highly transparent and highly effective heat-shielding material for blocking infrared radiation.

Figure 1:
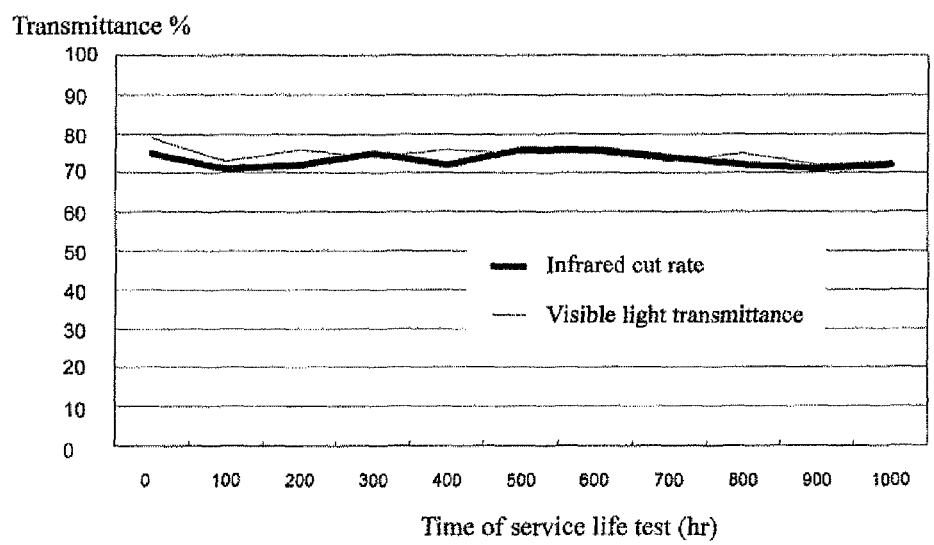
FIG. 1 is a plot showing the results of a service life test conducted on the composite tungsten oxychloride particles of the present invention.

Moreover, according to the results of a service life test as shown in FIG. 1, the composite tungsten oxychloride of the present invention exhibits long-term quality stability and is good for industrial use.

The composite tungsten oxychloride of the present invention has the chemical formula $Cs_XN_YWO_{3-Z}Cl_C$, wherein Cs is cesium; N is tin (Sn) or antimony (Sb) or bismuth (Bi); W is tungsten; O is oxygen; and X, Y, Z, and C are positive numbers satisfying the following conditions:

$X≤1.0, Y≤1.0, Y/X≤1.0,$ $Z≤0.6,$ and $C≤0.1.$

When the element N coexists with the element cesium (Cs), and the co-doping ratio of the element N to the element cesium (Cs) (i.e., Y/X) is less than or equal to 1.0 (i.e., Y/X≤1.0), the composite tungsten oxychloride of the present invention features high transparency and highly effective thermal insulation. When the co-doping ratio (Y/X) is greater than 1.0, however, the transparency and thermal insulation effect of the composite tungsten oxychloride lower.

The composite tungsten oxychloride of the present invention contains the element chlorine and is co-doped with the element cesium (Cs) and a metal element in a different group in the period table, namely tin (Sn) or antimony (Sb) or bismuth (Bi). The transparency and thermal insulation effect of the composite tungsten oxychloride are apparently better than those of a composite metal tungsten oxyhalide containing a halogen-group element other than chlorine or a combination of such non-chlorine halogen-group elements. For example, the composite tungsten oxychloride of the present invention provides better thermal insulation than a composite tungsten oxyhalide containing the halogen element F, Br, I, or At. Hence, the composite tungsten oxychloride of the present invention is suitable for making a highly transparent heat-shielding film to be adhered to the glass panels of buildings and automobiles.

Figure 2:
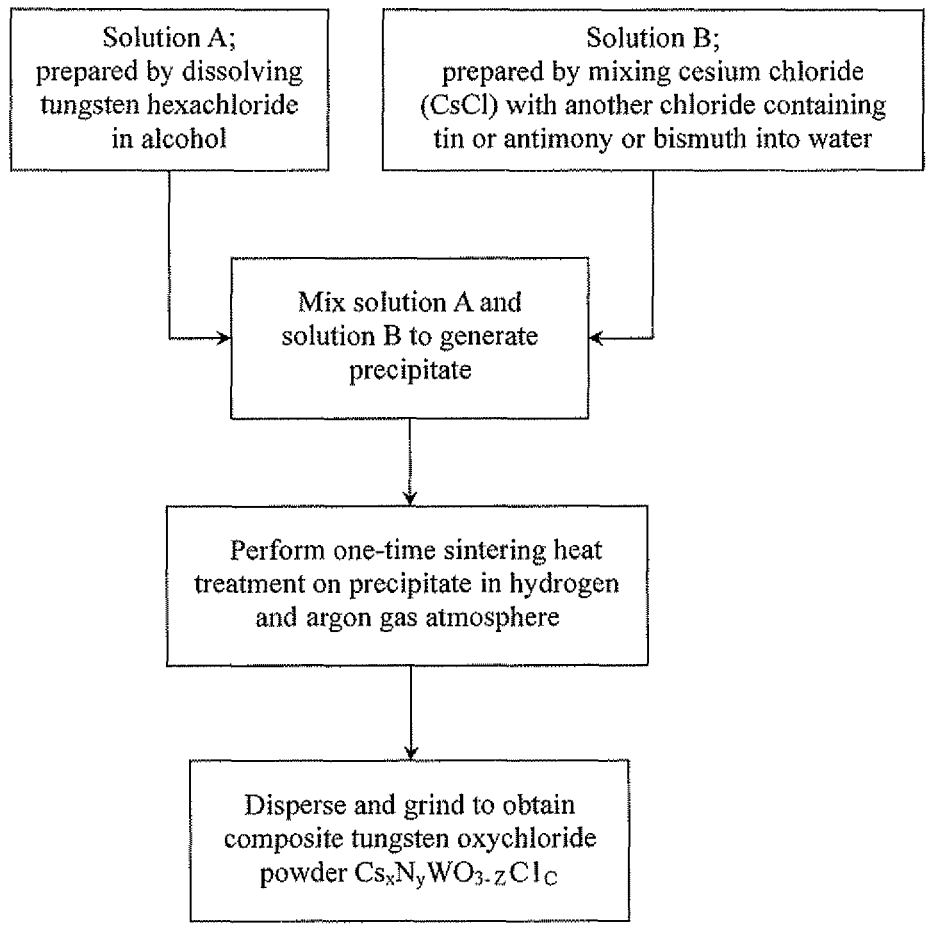
FIG. 2 is a flowchart of the method of the present invention for making a composite tungsten oxychloride.

Referring to FIG. 2, the present invention also discloses a method for making a composite tungsten oxychloride, wherein the method includes the following steps:

a. Prepare a solution A by dissolving tungsten hexachloride in alcohol.

b. Prepare a solution B by mixing cesium chloride (CsCl) and another metal-element-containing chloride into water in appropriate amounts (in an appropriate ratio), wherein the metal element in the latter chloride is one or more selected from the group consisting of tin (Sn), antimony (Sb), and bismuth (Bi).

c. Co-deposit the solutions A and B to generate a precipitate at least containing tungsten oxytetrachloride (WOCl$_4$) and certain chlorides, wherein the chlorides in the precipitate depend on the ingredients of the solution B and include one or more of tin chloride, antimony chloride, and bismuth chloride, in addition to the precipitate of cesium chloride.

d. Perform a one-time sintering heat treatment on the precipitate of step c to produce a sintered powder, wherein the precipitate of step c may go through a solvent-filtering step and a drying step prior to the heat treatment.

The solvent-filtering step is carried out by centrifugation or filtration to remove the solvent in the precipitate of step c.

The drying step is carried out by putting the precipitate which has gone through the solvent-filtering step into an environment at a temperature of 115-145° C., and allowing the precipitate to dry at the aforesaid temperature for one hour.

To perform the one-time sintering step, the precipitate of step c or the precipitate having gone through the drying step is put into a tube furnace or a block furnace (hereinafter collectively referred to as a high-temperature furnace) for high-temperature sintering at a temperature rising rate of 2-10° C./min. During the sintering process, hydrogen gas (H$_2$) and an inert gas such as argon gas (Ar) are simultaneously supplied into the high-temperature furnace. With the hydrogen gas (H$_2$) serving as a reductive gas, the sintering temperature of the high-temperature furnace rises from room temperature to 450-800° C., and the heat treatment continues for 1-2 hours. Once the high-temperature furnace has cooled down, a composite tungsten oxychloride sintered powder having the chemical formula Cs$_x$N$_y$WO$_{3-z}$Cl$_c$ (hereinafter referred to as the composite tungsten oxychloride powder) is produced.

While performing the one-time sintering heat treatment, not only is the temperature rising rate of the high-temperature furnace controlled at 2-10° C. per minute, but also the sintering heat treatment is applied to the composite tungsten oxychloride at a steady temperature for a predetermined period of time; thus, the dual purpose of drying and annealing the composite tungsten oxychloride is achieved. The composite tungsten oxychloride powder having received the aforesaid heat treatment has a stable chemical composition with reduced variability, will not produce composite tungsten oxychlorides of improper element proportions, and features good near-infrared absorptivity.

The composite tungsten oxychloride powder of the present invention can be used as a starting material of a highly transparent heat-shielding film. To this end, the foregoing method further includes the following steps:

e. Grind and thereby pulverize the composite tungsten oxychloride powder produced by the previous steps.

f. Add a binder and a specifically formulated agent into an appropriate amount of the composite tungsten oxychloride fine powder of step e. Stir and grind the mixture to produce a slurry (also referred to as a coating fluid). The purpose of adding the agent is to facilitate uniform dispersion of the composite tungsten oxychloride fine powder. The agent used can be one of a coupling agent, a surfactant, a dispersion agent, a polymer modifier, and an ultraviolet radiation absorbing agent, or a combination thereof.

g. Apply the coating fluid of step f to a transparent substrate, such as a polyethylene terephthalate (PET) film, by a wet-coating process so as to form a transparent heat-shielding film.

For example, the composite tungsten oxychloride fine powder of step e is added into a toluene solvent to produce a solution in which the composite tungsten oxychloride fine powder takes up 20% by weight (20 wt %). Then, a polymer dispersion agent is added into the solution at 6 wt %. After the solution is ground and dispersed with 1-mm yttrium-stabilized zirconium oxide beads, a dispersion in which the particle size of composite tungsten oxychloride is less than 80 nm is obtained.

The dispersion is mixed with an acrylic resin (manufactured by Nan Ya Plastics Corporation under the product number SSM7) to produce a coating fluid in which the dispersion takes up 20 wt %. Then, the coating fluid is applied to a transparent substrate by a wet-coating process, wherein the transparent substrate can be a glass substrate or a polymer film made of (PET), polyethylene naphthalate (PEN), polycarbonate (PC), polyvinyl chloride (PVC), polypropylene (PP), polyethylene (PE), acrylic resin, polyarylate (PAr), or cyclo-olefin polymer (COP). After the coating fluid is dried at 120° C. for two minutes, a transparent heat-shielding film is formed.

The transparent heat-shielding film produced by the foregoing steps has excellent infrared-blocking ability and a high visible light transmittance, as demonstrated further below by embodiments of the present invention.

The physical properties of the transparent heat-shielding film of the present invention are evaluated by the following tests.

1. Visible Light Transmittance (VLT %) Test:

The transmittance and haze of a transparent heat-shielding film are tested with the TC-H III Haze Meter produced by Tokyo Denshoku Co., Ltd. of Japan, and the test is conducted according to the JIS K7705 testing standard. The higher the visible light transmittance, the more transparent the transparent heat-shielding film.

2. Infrared Cut Rate (IR Cut %) Test:

The infrared cut rate of a polyester film is tested with the LT-3000 infrared cut rate tester produced by HOYA of Japan, and the test is conducted according to the JIS R3106 testing standard. The higher the infrared cut rate, the more effective the polyester film is in thermal insulation.

3. The combined index for transparency and thermal insulation is obtained by summing up the test results of the above two tests (i.e., VLT %+IR cut %). A higher combined index means a better overall performance in transparency and thermal insulation.

4. Composite Tungsten Oxychloride Service Life Test:

In a 1000-hour service life test, a plurality of transparent heat-shielding films are irradiated with an accelerated weathering tester produced by Q-PANNEL under the model number N.120.SOLAREYE 313NM, and every 100 hours a film is taken out and subjected to the visible light transmittance (VLT %) test and the infrared cut rate (IR cut %) test.

Embodiment 1

Tungsten hexachloride is mixed with alcohol to produce a blue solution A with a pH value of about 0. Cesium chloride (CsCl) and antimony trichloride (SbCl$_3$) are mixed with water, with the ratio of cesium chloride (CsCl) to antimony trichloride (SbCl$_3$) being 1 mole to 0.1 mole; thus, a transparent solution B is produced. The two solutions A and B are co-deposited to generate a precipitate. The chemical reaction formulas involved are as follows:

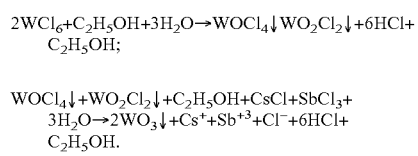

Following that, the precipitate is put into a high-temperature furnace into which argon gas and hydrogen gas are supplied at a specific flow rate. The temperature of the high-temperature furnace is increased from room temperature to 485-515° C. (the average temperature being 500° C.) at a temperature rising rate of 2° C. per minute, and the heat treatment continues for one hour.

After the heat treatment, a composite tungsten oxychloride containing the elements cesium and antimony and having a pH value of about 7 is obtained. The formula of the reaction is:

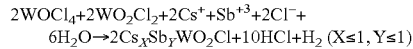
$2WOCl_4+2WO_2Cl_2+2Cs^++Sb^{+3}+2Cl^-+$
$6H_2O \rightarrow 2Cs_XSb_YWO_2Cl+10HCl+H_2$ (X≤1, Y≤1)

Then, the composite tungsten oxychloride powder is added into a toluene solvent to produce a 20 wt % solution. The solution is added with a polymer dispersion agent at 6 wt % and is ground and dispersed with 1-mm yttrium-stabilized zirconium oxide beads. The result is a ground dispersion of composite tungsten oxychloride having a particle size less than 80 nm.

The ground dispersion is mixed with an acrylic resin (manufactured by Nan Ya Plastics Corporation under the product number SSM7) to produce a 20 wt % coating fluid. The coating fluid is applied to a PET film by a wet-coating process and let dry at 120° C. for two minutes. Consequently, a transparent heat-shielding film is obtained. The transmittance of radiation in the wavelength range of 300-2000 nm (i.e., VLT % and IR cut %) is tested, and the results are shown in Table 1.

Embodiment 2

This embodiment is similar to embodiment 1 except that, when cesium chloride and antimony trichloride ($SbCl_3$) are mixed with water to produce the transparent solution B, the ratio of cesium chloride to antimony trichloride ($SbCl_3$) is 1 mole to 0.5 mole.

The transmittance of 300-2000-nm radiation through the resultant transparent heat-shielding film is tested, and the results are shown in Table 1.

Embodiment 3

This embodiment is similar to embodiment 2 except that tin trichloride ($SnCl_3$) is used in place of antimony trichloride ($SbCl_3$) in preparation of the transparent solution B.

The transmittance of 300-2000-nm radiation through the resultant transparent heat-shielding film is tested, and the results are shown in Table 1. In addition, the results of the service life test are plotted in FIG. 1.

Embodiment 4

This embodiment is similar to embodiment 2 except that bismuth trichloride ($BiCl_3$) is used in place of antimony trichloride ($SbCl_3$) in preparation of the transparent solution B.

The transmittance of 300-2000-nm radiation through the resultant transparent heat-shielding film is tested, and the results are shown in Table 1.

Embodiment 5

This embodiment is similar to embodiment 1 except that, when cesium chloride and antimony trichloride ($SbCl_3$) are mixed with water to produce the transparent solution B, the ratio of cesium chloride to antimony trichloride ($SbCl_3$) is 1 mole to 0.7 mole.

Figure 3:
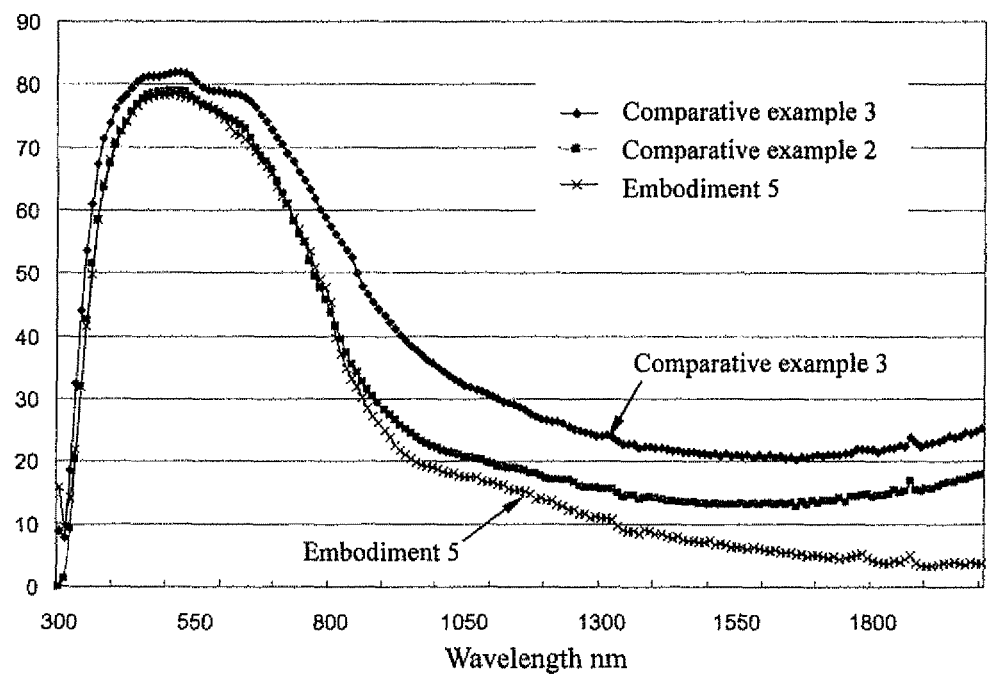
FIG. 3 is a transmittance spectrum of the composite tungsten oxychloride particles of the present invention.

The transmittance of 300-2000-nm radiation through the resultant transparent heat-shielding film is tested, and the results are shown in Table 1 and plotted in FIG. 3.

Embodiment 6

This embodiment is similar to embodiment 5 except for the following: the solvent in the precipitate is removed by filtration such that a mud-like precipitate containing tungsten chloride, cesium chloride, and antimony trichloride is obtained; and the sintering temperature of the high-temperature furnace is raised from room temperature to 785-815° C. (the average temperature being 800° C.).

The transmittance of 300-2000-nm radiation through the resultant transparent heat-shielding film is tested, and the results are shown in Table 1.

Embodiment 7

This embodiment is similar to embodiment 5 except that the temperature rising rate of the high-temperature furnace is changed to 10° C. per minute.

The transmittance of 300-2000-nm radiation through the resultant transparent heat-shielding film is tested, and the results are shown in Table 1.

Embodiment 8

This embodiment is similar to embodiment 3 except that, when cesium chloride and tin trichloride ($SnCl_3$) are mixed with water to produce the transparent solution B, the ratio of cesium chloride to tin trichloride ($SnCl_3$) is 1 mole to 0.7 mole.

The transmittance of 300-2000-nm radiation through the resultant transparent heat-shielding film is tested, and the results are shown in Table 1.

Embodiment 9

This embodiment is similar to embodiment 1 except that, when cesium chloride and antimony trichloride ($SbCl_3$) are mixed with water to produce the transparent solution B, the ratio of cesium chloride to antimony trichloride ($SbCl_3$) is 1 mole to 1.0 mole.

The transmittance of 300-2000-nm radiation through the resultant transparent heat-shielding film is tested, and the results are shown in Table 1.

Comparative Example 1

This comparative example is similar to embodiment 5 except that the temperature rising rate of the high-temperature furnace is changed to 15° C. per minute.

The transmittance of 300-2000-nm radiation through the resultant transparent heat-shielding film is tested, and the results are shown in Table 1.

Comparative Example 2

This comparative example is similar to embodiment 1 except that the transparent solution B is prepared by mixing only cesium chloride with water.

The transmittance of 300-2000-nm radiation through the resultant transparent heat-shielding film is tested, and the results are shown in Table 1 and plotted in FIG. 3.

Comparative Example 3

This comparative example is similar to embodiment 1 except for the following: the transparent solution B is prepared by mixing only cesium chloride with water; and the sintering temperature of the high-temperature furnace is raised from room temperature to 785-815° C. (the average temperature being 800° C.).

The transmittance of 300-2000-nm radiation through the resultant transparent heat-shielding film is tested, and the results are shown in Table 1 and plotted in FIG. 3.

Comparative Example 4

This comparative example is similar to embodiment 5 except that the heat treatment is carried out in two stages. In the first-stage high-temperature-furnace heat treatment, hydrogen gas ($H_2$) is supplied at a specific flow rate, and the temperature of the high-temperature furnace is raised from room temperature to 485-515° C. (the average temperature being 500° C.) at a temperature rising rate of 2° C. per minute. The first-stage high-temperature-furnace heat treatment continues for one hour. When the high-temperature furnace is cooled down to room temperature, the second-stage high-temperature-furnace heat treatment begins, in which argon gas alone is supplied at a specific flow rate and the temperature of the high-temperature furnace is raised from room temperature to 785-815° C. (the average temperature being 800° C.) at the rate of 2° C. per minute. The second-stage high-temperature-furnace heat treatment continues for one hour.

The transmittance of 300-2000-nm radiation through the resultant transparent heat-shielding film is tested, and the results are shown in Table 1.

Comparative Example 5

Solid tungsten trioxide ($WO_3$) and solid cesium carbonate ($Cs_2CO_3$) are evenly mixed together. Then, the powder mixture is put into a high-temperature furnace into which argon gas and hydrogen gas are supplied at a specific flow rate. The temperature of the high-temperature furnace is increased from room temperature to 485-515° C. (the average temperature being 500° C.) at 2° C./min, and the heat treatment continues for one hour.

After the heat treatment, a composite tungsten oxychloride is obtained. By means of an X-ray diffractometer and a spectrometer with a scanning electron microscope, the composite tungsten oxychloride is identified as having a hexagonal crystal structure and containing no halogens.

Then, a transparent heat-shielding film is produced using the method of embodiment 1. The transmittance of 300-2000-nm radiation through the film is tested, and the results are shown in Table 1.

Comparative Example 6

This comparative example is similar to embodiment 5 except that sodium chloride (NaCl) is used in place of cesium chloride in preparation of the transparent solution B.

The transmittance of 300-2000-nm radiation through the resultant transparent heat-shielding film is tested, and the results are shown in Table 1.

Comparative Example 7

This comparative example is similar to embodiment 1 except that, when cesium chloride and antimony trichloride ($SbCl_3$) are mixed with water to produce the transparent solution B, the ratio of cesium chloride to antimony trichloride ($SbCl_3$) is 1 mole to 1.1 moles.

The transmittance of 300-2000-nm radiation through the resultant transparent heat-shielding film is tested, and the results are shown in Table 1.

Results:

1. The transparent heat-shielding film produced in embodiment 3 undergoes a service life test that involves 1000-hour irradiation, and the test results are plotted in FIG. 1. As can be clearly seen in FIG. 1, variations in both the infrared cut rate and the transmittance remain within 10%. Therefore, the transparent heat-shielding film of embodiment 3 has long-term quality stability and is good for industrial use.

2. Regarding the visible light transmittance and infrared cut rate in the wavelength range of 300-2000 nm, Table 1 shows that the combined indices for transparency and thermal insulation (VLT %+IR cut %) of the transparent heat-shielding films in embodiments 1-9 are all higher than 160, whereas the combined indices of the transparent heat-shielding films in comparative examples 1-7 are all lower than 150.

It is thus verified that the composite tungsten oxychloride of the present invention is suitable for use as an infrared-blocking thermal insulation material. Moreover, a transparent heat-shielding film made of the composite tungsten oxychloride can effectively cut infrared radiation in the wavelength range of 1000-2000 nm while having a high transmittance in the visible light band of 400-600 nm.

3. The composite tungsten oxychlorides in embodiments 2-4 contain the element chlorine, are co-doped with the element cesium (Cs) and one of the metal elements tin (Sn), antimony (Sb), and bismuth (Bi), and satisfy the co-doping ratio condition $Y/X \leq 1.0$. According to the test results in Table 1, the transparent heat-shielding films made of such composite tungsten oxychlorides have visible light transmittances ranging from 70% to 72% and infrared cut rates ranging from 91% to 92%.

It is thus verified that the composite tungsten oxychloride of the present invention, which is co-doped with the element cesium (Cs) and one of the metal elements tin (Sn), antimony (Sb), and bismuth (Bi), is suitable for making a transparent heat-shielding film.

4. The transparent heat-shielding film in comparative example 5 is made of a composite tungsten oxychloride that does not contain halogens. According to the combined indices for transparency and thermal insulation in Table 1, this transparent heat-shielding film has much poorer performance than those in embodiments 1-9.

Hence, it can be known that the element chlorine in the composite tungsten oxychloride of the present invention contributes to better infrared-blocking performance.

5. A comparison between the transmittance curves in FIG. 3 shows that the transparent heat-shielding film in embodiment 5 has a higher transmittance in the visible light band (400-600 nm) and is more effective in blocking infrared radiation (1000-2000 nm) than the transparent heat-shielding films in comparative examples 2 and 3.

The composite tungsten oxychloride in embodiment 5 contains the element chlorine and is co-doped with the element cesium (Cs) and the metal element antimony (Sb). By contrast, the composite tungsten oxychlorides in comparative examples 2-3 contain the element chlorine and the metal element cesium but are not doped with the metal element antimony (Sb).

It is thus verified that the co-dopants of the composite tungsten oxychloride of the present invention, i.e., the element cesium (Cs) and the metal element tin (Sn) or antimony (Sb) or bismuth (Bi), produce a synergetic effect on the resultant transparent heat-shielding film such that the infrared cut rate and visible light transmittance of the transparent heat-shielding film are significantly enhanced.

6. The composite tungsten oxychlorides in embodiments 1, 2, 5, and 9 and comparative example 7 are co-doped with the element cesium (Cs) and the metal element antimony (Sb). The co-doping ratios of antimony (Sb) to cesium (Cs) in embodiments 1, 2, 5, and 9 range from 0.1 to 1.0 and thus satisfy the condition Y/X≤1.0. The co-doping ratio in comparative example 7, however, does not satisfy the aforesaid condition.

The test results in Table 1 show that, as long as the condition Y/X≤1.0 is satisfied, the higher the ratio Y/X is, the lower the visible light transmittance, and the higher the infrared cut rate (thermal insulation effect), of the resultant transparent heat-shielding film will be. The composite tungsten oxychloride in comparative example 7 does not comply with the condition Y/X≤1.0 and therefore is not suitable for making a heat-shielding film of high transparency.

The method disclosed herein for making a composite tungsten oxychloride allows the ratio Y/X (also referred to as the co-doping ratio) to be adjusted according the requirements of different applications, provided that the condition Y/X≤1.0 is satisfied. The adjustability of the ratio Y/X makes it possible to produce composite tungsten oxychlorides of different properties and highly transparent heat-shielding films for different uses.

7. According to the combined indices for transparency and thermal insulation in Table 1, the transparent heat-shielding films in embodiments 5 and 6 have better performance than the transparent heat-shielding film in comparative example 4 when the visible light transmittance and the infrared cut rate are considered as a whole.

The difference between embodiments 5 and 6 and comparative example 4 lies in the high-temperature sintering processes of the composite tungsten oxychlorides. More specifically, embodiments 5 and 6 use a one-time sintering heat treatment in which hydrogen gas ($H_2$) and argon gas (Ar) are simultaneously supplied. On the other hand, comparative example 4 uses a two-stage heat treatment, with hydrogen gas and argon gas being respectively supplied in the first-stage heat treatment and the second-stage heat treatment.

It is thus verified that, by applying a one-time sintering heat treatment and supplying hydrogen gas ($H_2$) and argon gas (Ar) at the same time, the method of the present invention can make a composite tungsten oxychloride effective in absorbing near-infrared radiation. Furthermore, the production process is simple, and the costs otherwise required for a multi-stage heat treatment and sequential gas supply can be saved.

8. Referring to Table 1, the combined indices for transparency and thermal insulation of the transparent heat-shielding films in embodiments 5 and 6 show that the higher the sintering temperature is, the more transparent the resultant composite tungsten oxychloride powder will be.

9. According to the combined indices for transparency and thermal insulation in Table 1, the transparent heat-shielding films in embodiments 5 and 7 have better performance than the transparent heat-shielding film in comparative example 1 when the visible light transmittance and the infrared cut rate are considered as a whole.

The difference between embodiment 5, embodiment 7, and comparative example 1 lies in the temperature rising rates in the high-temperature sintering processes of the composite tungsten oxychlorides. The temperature rising rate is set at 2° C./min in embodiment 5, 10° C./min in embodiment 7, and 15° C./min in comparative example 1.

It is thus verified that, by controlling the temperature rising rate of the one-time sintering heat treatment at 2-10° C./min, the method of the present invention can make a composite tungsten oxychloride effective in absorbing near-infrared radiation.

TABLE 1

Manufacturing methods and physical property test results of various embodiments and comparative examples

| Transparent heat-shielding film sample | Starting materials | | Solid substance to mix | Solvent-filtering method | High-temperature furnace heat treatment conditions | | VLT (%) | IR cut (%) | VLT + IR cut (%) |
|---|---|---|---|---|---|---|---|---|---|
| | $A^{(1)}$ | $B^{(2)}$ + $H_2O$ Solution to mix | | | 1st-stage heat treatment Temp. rising rate: #° C./min; under gas of $H_2$/Ar | 2nd-stage heat treatment | | | |
| Embodiment 1 | A | CsCl + SbCl$_3$ (1:0.1) | — | None | 500° C. × 1 hr; 2° C./min; $H_2$/Ar | None | 73 | 91 | 164 |
| Embodiment 2 | A | CsCl + SbCl$_3$ (1:0.5) | — | None | 500° C. × 1 hr; 2° C./min; $H_2$/Ar | None | 72 | 92 | 164 |
| Embodiment 3 | A | CsCl + SnCl$_3$ (1:0.5) | — | None | 500° C. × 1 hr; 2° C./min; $H_2$/Ar | None | 72 | 91 | 163 |
| Embodiment 4 | A | CsCl + BiCl$_3$ (1:0.5) | — | None | 500° C. × 1 hr; 2° C./min; $H_2$/Ar | None | 70 | 91 | 161 |
| Embodiment 5 | A | CsCl + SbCl$_3$ (1:0.7) | — | None | 500° C. × 1 hr; 2° C./min; $H_2$/Ar | None | 71 | 96 | 167 |
| Embodiment 6 | A | CsCl + SbCl$_3$ (1:0.7) | — | Filtration | 800° C. × 1 hr. 2° C./min; $H_2$/Ar | None | 80 | 82 | 162 |
| Embodiment 7 | A | CsCl + SbCl$_3$ (1:0.7) | — | None | 500° C. × 1 hr; 10° C./min; $H_2$/Ar | None | 71 | 91 | 162 |

TABLE 1-continued

Manufacturing methods and physical property test results of various embodiments and comparative examples

| Transparent heat-shielding film sample | Starting materials | | Solid substance to mix | Solvent-filtering method | High-temperature furnace heat treatment conditions | | VLT (%) | IR cut (%) | VLT + IR cut (%) |
|---|---|---|---|---|---|---|---|---|---|
| | Solution to mix | | | | 1st-stage heat treatment Temp. rising rate: #° C./min; under gas of $H_2$/Ar | 2nd-stage heat treatment | | | |
| | $A^{(1)}$ | $B^{(2)} + H_2O$ | | | | | | | |
| Embodiment 8 | A | CsCl + $SnCl_3$ (1:0.7) | — | None | 500° C. × 1 hr; 2° C./min; $H_2$/Ar | None | 71 | 92 | 163 |
| Embodiment 9 | A | CsCl + $SbCl_3$ (1:1.0) | — | None | 500° C. × 1 hr; 2° C./min; $H_2$/Ar | None | 70 | 97 | 167 |
| Comparative example 1 | A | CsCl + $SbCl_3$ (1:0.7) | — | None | 500° C. × 1 hr; 15° C./min; $H_2$/Ar | None | 68 | 71 | 139 |
| Comparative example 2 | A | CsCl | — | None | 500° C. × 1 hr; 2° C./min; $H_2$/Ar | None | 72 | 76 | 148 |
| Comparative example 3 | A | CsCl | — | None | 800° C. × 1 hr; 2° C./min; $H_2$/Ar | None | 76 | 73 | 149 |
| Comparative example 4 | A | CsCl + $SbCl_3$ (1:0.7) | — | None | 500° C. × 1 hr; 2° C./min; $H_2$ | 800° C. × 1 hr; 2° C./min; Ar | 84 | 13 | 97 |
| Comparative example 5 | — | — | $WO_3$ + $Cs_2CO_3$ | — | 500° C. × 1 hr; 2° C./min; $H_2$/Ar | None | 70 | 60 | 130 |
| Comparative example 6 | A | NaCl + $SbCl_3$ (1:0.7) | — | None | 500° C. × 1 hr; 2° C./min; $H_2$/Ar | None | 68 | 70 | 138 |
| Comparative example 7 | A | CsCl + $SbCl_3$ (1:1.1) | — | None | 500° C. × 1 hr; 2° C./min; $H_2$/Ar | None | 65 | 77 | 142 |

Note:
[1] A represents a solution obtained by dissolving tungsten hexachloride in alcohol ($WCl_6 + C_2H_5OH$).
[2] B represents a metal chloride, to which water is added to produce a solution.
[3] VLT % + IR cut % represents the combined index for transparency and thermal insulation.

What is claimed is:

1. A transparent heat-shielding material having a chemical formula $Cs_XN_YWO_{3-Z}Cl_C$ and capable of blocking infrared radiation in a wavelength range of 800-2000 nm; wherein Cs is cesium; N is tin (Sn) or antimony (Sb) or bismuth (Bi); W is tungsten; O is oxygen; and X, Y, Z, and C are positive numbers satisfying the following conditions:
$X \leq 1.0$, $Y \leq 1.0$, $Y/X \leq 1.0$, $Z \leq 0.6$, and $C \leq 0.1$.

2. The transparent heat-shielding material as defined in claim 1, wherein the transparent heat-shielding material is capable of blocking infrared radiation in a wavelength range of 800-1000 nm.

3. A transparent heat-shielding film is made of the transparent heat-shielding material of claim 1.

* * * * *